United States Patent [19]

Pichat

[11] Patent Number: 5,252,127

[45] Date of Patent: Oct. 12, 1993

[54] PROCESS FOR THE INSOLUBILIZATION AND AGGREGATION OF SMOKE PURIFICATION WASTE MATERIALS

[76] Inventor: Philippe Pichat, 18 rue des Tournelles, 75004 Paris, France

[21] Appl. No.: 799,835

[22] Filed: Nov. 29, 1991

Related U.S. Application Data

[63] Continuation-in-part of Ser. No. 498,082, Mar. 20, 1990, abandoned.

[30] Foreign Application Priority Data

Mar. 20, 1989 [FR] France .............................. 89 03587

[51] Int. Cl.$^5$ .............................................. C04B 18/06
[52] U.S. Cl. .................................... 106/705; 106/710; 106/792; 106/796; 106/DIG. 1; 588/252; 588/256
[58] Field of Search ................ 588/252, 256; 106/704, 106/705, 710, 792, 796, DIG. 1; 210/751

[56] References Cited

U.S. PATENT DOCUMENTS

| | | | |
|---|---|---|---|
| 3,720,609 | 3/1973 | Smith et al. | 210/751 |
| 4,050,871 | 9/1977 | Kleeberg et al. | 425/317 |
| 4,226,630 | 10/1980 | Styron | 106/705 |
| 4,250,134 | 2/1981 | Minnick | 264/140 |
| 4,344,796 | 8/1982 | Minnick | 106/84 |
| 4,353,749 | 10/1982 | Ray et al. | 106/705 |
| 4,377,414 | 3/1983 | Buschmann et al. | 106/85 |
| 4,514,307 | 4/1985 | Chestnut et al. | 210/751 |
| 4,741,776 | 5/1988 | Bye et al. | 106/704 |
| 4,840,671 | 6/1989 | Lynn et al. | 106/705 |
| 4,900,360 | 2/1990 | Whitescaner et al. | 210/751 |
| 4,902,431 | 2/1970 | Nicholson et al. | 210/751 |

FOREIGN PATENT DOCUMENTS

| | | |
|---|---|---|
| 389329 | 3/1990 | European Pat. Off. |
| 3518411 | 11/1986 | Fed. Rep. of Germany . |
| 0134687 | 10/1980 | Japan .................. 210/751 |

OTHER PUBLICATIONS

"Recycling of Steelmaking Dusts", Paul G. Barnard et al., in the *Proceedings of the Third Mineral Waste Utilization Symposium*, Editor: Schwartz, M. A. (1972), pp. 63-68.

"SARP Industries-Treatment by Incineration-Schematic", Brochure of SARP Industries, Jan. 1989.

*Primary Examiner*—Karl Group
*Assistant Examiner*—Paul Marcantoni
*Attorney, Agent, or Firm*—Browdy and Neimark

[57] ABSTRACT

Smoke purification waste materials (SPW), rich in lime, are mixed with a product containing at least 60% silica and/or aluminum to bring the pH to a value of between 7 and 11.5 and with a quantity of water of between 15% and 160% of the weight of the waste materials and said product. In practice, the ratio of $SiO_2$ and $Al_2O_3$ over CaO must be at least equal to 0.8. Solid compounds are obtained that are virtually insoluble in water and that are non-pollutant.

24 Claims, No Drawings

PROCESS FOR THE INSOLUBILIZATION AND AGGREGATION OF SMOKE PURIFICATION WASTE MATERIALS

CROSS REFERENCE TO RELATED APPLICATIONS

This application is a continuation-in-part of U.S. patent application Ser. No. 498,082, filed Mar. 20, 1990, now abandoned, the contents of which are hereby incorporated by reference.

FIELD OF THE INVENTION

This invention pertains to the field of treating waste products in order to use them and transform them into compact masses that trap toxic elements and products, especially metals. It applies specifically to the treatment of waste materials from the purification of smoke produced during incineration.

BACKGROUND OF THE INVENTION

In the course of incineration of waste materials of various origins, the mixture of waste materials (liquids, sludge, solids) is burned in an incinerator, generally a rotary kiln, under a gaseous current. This produces clinker and fine particles of fly ash (abbreviated herein as FA) and acid gases carrying heavy metals and metalloids. After the clinker and fly ash are removed, these gaseous wastes are made to react with excess lime (or products containing lime) and the resultant treated smoke is sent through bag filters (or dust extractors). These dust filters collect the smoke purification waste materials (abbreviated herein as SPW) which is composed of a very fine, flour-like product.

SPW substantially contains chlorides, lime that has not reacted during purification in the form of $CaCO_3$ and $Ca(OH)_2$, sulfate, and unburned materials, including fairly substantial quantities of heavy and toxic metals such as lead, copper, zinc, cadmium, iron, aluminum, etc. When they are placed into contact with water, SPW forms a highly basic pH because of its richness in lime. It tends to solubilize due to atmospheric influences and acidic conditions and to produce pollution due especially to leaching of toxic metals. Due to the high content of chlorine and heavy metals, insolubilization is very difficult.

These waste materials, or SPW, are the raw materials which are treated according to the present invention and are distinctly different in composition from other gaseous waste products such as fly ash, electric arc furnace dust waste or desulfurization waste product from coal, oil or lignite thermal power plants.

While the content of SPW will vary depending on the material being burned from day to day, it generally has a chlorine content of between 15 to 30%, a calcium oxide content of between 15 and 30%, a total sodium and potassium content of 0.5 to 8%, less than 2% sulfur and 0.1 to 2% metals including heavy metals. In this alkaline environment the metals are precipitated in salt form.

Processes for insolubilizing waste materials containing SPW have been proposed and consist essentially of treatments with sodium silicate, Portland cement or mixtures of said products. The products obtained using such treatments are highly basic (pH generally greater than 12) and they tend to be ineffective at fixing metal elements, especially those such as lead and zinc. Moreover, hydrogen can form in an untimely manner according to the following reaction:

$$OH^- + H_2O + Al \rightarrow Al_2O- + 3/;2\ H_2$$

The hydrogen released may cause an explosive hazard and given the highly alkaline conditions, any explosion would spread corrosive materials.

This product contains an additional problem as well because the waste materials are generally entrapped within the material rather than being part of the solid mass. As a result, the wastes may be viewed as weakening impurities in the cement which may be easily released into the environment.

OBJECTS OF THE INVENTION

It is an object of the present invention to overcome deficiencies of the prior art, such as those noted above.

It is another object of the present invention to transform SPW into products that are virtually insoluble in water and are easy to aggregate into masses that are inert, non-toxic, or suitable for use in concrete.

DETAILED DESCRIPTION OF THE PREFERRED EMBODIMENTS

According to an essential characteristic of the process according to the invention, lime-rich SPW waste materials are mixed with a product containing at least 60% of a component comprising silica, alumina or a mixture thereof to bring the pH to a value of between 7 and 11.5 and also with a quantity of water at least equal to the water composing the final product. In practice, this quantity of water can vary, depending on the type of SPW to be treated, from between 15% and 160% of the weight of the waste material and the additive product. For the purposes of this invention, it is preferable that the lime content of the SPW be below about 35%. This is usually accomplished at the incinerator facility. While the amount of sulfur in SPW is usually lower, it is preferable that the content be kept below 2% for the purposes of this invention.

The product rich in silica and/or alumina can come from various sources. For example, fossil silica (which generally contains at least 80% $SiO_2$), silica or ground pozzolana, waste products from silica coming, for example, from the production of ferrosilicium and asbestos waste materials can be used. The source of alumina can be composed of pulverulent alumina or other suitable sources. One can also advantageously use silico-aluminates such as, for example, clay or, better yet, fly ash from an incinerator (FA), which itself constitutes potentially-dangerous waste due to the presence of toxic metals which may be leached out. Through the use of the process according to the present invention, the bulk of these toxic metals and those contained in SPW can be trapped.

According to another embodiment of the present invention, the water added can be composed not only of regular, surface or underground water, but can also be composed of effluents or sludge from urban or industrial water purification stations, or leaching products from waste outlets. In practice, the moistening and mixing process according to the present invention can be done in a mixer or on a conveyor belt where part of the necessary water is sprayed on the SPW and its additive product.

After processing under the above conditions, the mixture obtained is pumped or compacted in the form of building blocks, for example, or is treated by one of the machines used in public works. According to one variation, such mixtures can also be extruded. While applicants do not intend to be bound by any highly detailed theory, the implementation of the procedure according to the invention is believed to consist of fixing the free lime in the SPW by the silica, alumina or silicate type of product added. For example, in the case of silica and in the presence of additive water, a compound of the type ($CaO$, $SiO_2$, $H_2O$) forms. This is formed by a chemical reaction bonding the components together to form a solid rock-like substance resembling the mineral tobermorite. When the silico-aluminate source is composed of FA, a gehilinite-type silico-aluminate (($CaO)_2$, $AlO_3$, $SiO_2$, $8H_2O$), or aluminates of the type (($CaO)_4$, $Al_2O_3$, 13 $H_2O$) are formed. In practice, the quantity of the product rich in silica and/or alumina added to the SPW is thus regulated so that the ratio of $SiO_2$ and/or $Al_2O_3$ over $CaO$ is at least equal to 0.8.

The products produced in accordance with the present invention are believed to incorporate the SPW into the crystal lattice being formed. As such, they are more permanently bound and less likely to leach at a later time. Furthermore, unlike the aggregation of waste materials with sodium silicate or Portland cement which merely holds the waste materials together, in the current invention, the SPW itself forms part of the structure. The result is a stronger solid with fewer weakening impurities and a reduced ability for materials to leach out of the solid.

Since the bulk of the materials form a crystal lattice in accordance with the present invention, the toxic heavy metals are tightly entrapped in the matrix. By contrast, when an external material is added, less than thorough mixing may result leaving clumps of metals and other soluble SPW materials lumped together and more leachable when the solid is broken.

The following examples, provided on an illustrative basis, show the results obtained by the implementation of the process according to its different variations.

EXAMPLE 1

The SPW (hereafter termed I) used in this example came from an industrial waste incinerator and substantially contained 26% $Cl_2$, 7% Na, 0.7% K, 16% $SO_4^{2-}$, 30% $CaO$ and metals such as (in parts per million, or ppm) Pb: 26.4; Cu: 0.8; Cd: 1.1; Zn: 5.6; Fe: 4. The COD (chemical oxygen demand) was 5990 ppm.

Moreover, as a water source, a liquid industrial waste (II) coming from a residual effluent purification station was used which had a pH of 7 and COD of 91500 and substantially contained the following, in terms of metals (in ppm): Pb: 0.5; Cu: 90; Cd: 2; Zn: 3; Fe: 0.4; Al: 20.

50 parts (by weight) of waste material (I) wa added to 50 parts (by weight) of aqueous effluent (II), then mixed with 20 parts (by weight) of fossil silica. The latter contained approximately 83% $SiO_2$, 5% $Al_2O_3$ and small quantities of oxides of Al, Fe, Ti, Ca, Mg and K.

The blended mixture hardened in a few days. After 8 months, part of the solid mass was broken into pieces and 50 g thereof was placed in a chromatography column, with distilled water passing at a speed of 100 ml per hour. The leached product obtained presented a COD reduced to only 2900 and the following quantities of metals (in ppm): Pb: 1; Cu: 1.6; Cd: 0.2; Zn: 0.2; Fe: 1.2; Al: 0.4.

EXAMPLE 2

50 parts of SPW (I) were mixed with 100 parts of a liquid waste material (III) coming from a sheet metal pickling and cleaning facility from the automobile industry, and which had a pH of 14 and a COD of 5096 and contained approximately the following (in ppm): Pb: 0.1; Cu: 0.8; Cd: 0.1; Zn: 0.8; Fe: 83.2; Al: 0.1.

59 parts of fossil silica were added and, operating as in Example 1, the sample was allowed to harden for 14 days. The following leaching results, from the chromatography column, were obtained: pH: 9.5; COD: 3000; Pb: 0.1; Cu: 0.8; Cd: 0.1; Zn: 0.1; Fe: 0.1.

EXAMPLE 3

50 parts of SPW (I) were mixed with 100 parts of a liquid waste material (IV), in this case an effluent of urban purification station sludge, which had a COD of 2450 and contained the following (in ppm): Pb: 81; Cu: 274; Cd: 7.3; Zn: 780; Fe: 9727.

After adding 25 parts (by weight) of ground silica, it hardened in a few days, and gave the following leaching results using the same column test as in Example 1: COD: 216; Pb: 0.1; Cu: 0.7; Cd: 0.03; Zn: 0.016; Fe: 0.16.

EXAMPLE 4

Following the method in Example 3 but using 100 parts (by weight) of SPW (I) and 100 parts of (IV), and adding 25 parts of ground pozzolana, the mixture was allowed to harden. Leaching yielded the following results: COD: 220; Pb: 0.2; Cu: 0.1; Cd: 0.14; Zn: 0.04; Fe: 0.03.

EXAMPLE 5

This time, the SPW (V) being treated came not from an industrial waste product incinerator, but from a municipal waste incinerator. This SPW, having a pH of 13, was characterized by the following leaching products (in ppm), according to DIN standard 38414: Pb: 28; Cu: 1.3; Cd: 1.8; Zn: 3.1; Fe: 4.2 and Al: 3.

120 parts (by weight) of (V) were mixed with 120 parts of silica coming from the thermal decomposition of cakes and with 100 parts of regular water. Solidification occurred in approximately one hour. The final material obtained, subjected to the leaching test according to DIN standard 38414, was characterized by the following concentrations (in ppm): Pb: 0.4; Cu: 0.1; Cd: 0.1; Zn: 0.1; Fe: 0.1; Al: <0.5.

EXAMPLE 6

In this example, fly ash (FA) was used as the source of silico-aluminate, which fly ash was obtained during the incineration of municipal waste materials according to Example 5 and characterized by the following leaching products according to DIN standard 38414: Pb: 74; Cu: 0.8; Cd: 465; Zn: 3800; Fe: 1; Al: 4. The pH of the FA was 7.3.

In a mixer, 120 parts of SPW (V) from Example 5 were combined with 30 parts of the FA, 100 parts of clay (source of silica) and 85 parts of regular water. Solidification occurred in approximately one hour. After leaching according to DIN standard 38414, the following metal concentrations (ppm) were obtained: Pb: 0.3; Cu: 0.1; Cd: 0.11; Zn: 0.1; Fe: 0.1 and Al: <4.

The mechanical resistance to compression on a 28-day old sample was 23 MPa (megaPascal).

EXAMPLE 7

This example illustrates the use of alumina instead of silica in the above examples.

In this case fly ash (FA) from household garbage incineration was used yielding the following results during leaching (in ppm): Pb: 6; Cd: 4; Zn: 7. A mixture was made with 132 parts of SPW (I), 34 parts of the aforementioned FA, 63 parts of pulverulent alumina and 54 parts of regular water.

After leaching of a hardened sample according to the aforementioned DIN standard, the metals declined to the following concentrations (in ppm): Pb: 0.5; Cd: 0.1 and Zn: 1.

EXAMPLE 8

50 parts of (I) and 100 parts of (II) were added to 167 parts of fly ash from coal as a source of silica and allowed to solidify.

The solidified material was subjected to the leaching test on a chromatographic column after 18 days, yielding the following results (in ppm): Pb: 0.8; Cu: 0.1; Zn: 0.1; Fe: 0.4; Al: 4; COD: 1900.

EXAMPLE 9

Proceeding as in Example 8, but using 116 parts of (I), 125 parts of (II) and 42 parts of an asbestos waste material coming from a school, as a source of silica, the materials were mixed and allowed to solidify.

Leaching on the test column yielded the following results: Pb: 4.1; Cu: 3.3; Cd: 0.5; Zn: 4.9; Fe: 1.5; Al: <0.1; and COD: 3816.

EXAMPLE 10

In this case, the starting material was 30 parts (by weight) of a mixture of 4 parts of the SPW, known as (V) in Example 5, and 1 part FA from Example 6. 100 parts of water and 62 parts of an asbestos waste material coming from a hospital (as a silica source) were added.

After 9 days, a sample of the hard material obtained was subjected to the leaching test in accordance with DIN standard 38414. The following metal concentrations (ppm) were obtained: Pb: 0.1; Cu: 0.1; Cd: 0.1; Zn: 0.1; Fe: 1; Al: 1 and COD: 1400.

The very low levels of leaching noted in Examples 9 and 10 demonstrate that the asbestos fibers were truly encapsulated by the process according to the present invention.

The mixtures obtained according to the present invention can, before solidification, be cut with the usual additives for the preparation of compounds for concrete (such as filler materials, liquefying agents, aggregates, etc.) when intended for use in construction or public works.

The foregoing description of the specific embodiments will so fully reveal the general nature of the invention that others can, by applying current knowledge, readily modify and/or adapt for various applications such specific embodiments without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A process for treating smoke purification waste materials obtained after clinker and fly ash have been removed, by reacting gasous smoke components with lime and then separating the lime-rich material from the smoke produced during the process of incineration of waste materials, to obtain solid compounds which are substantially insoluble in water and are non-polluting, consisting essentially of:

mixing the lime-rich smoke purification waste material with an additive containing at least 60% of a component selected from the group consisting of silica, alumina and a mixture thereof, to bring the pH to between 7 and 11.5, and a quantity of water between 15% and 160% of the weight of the smoke purification waste material and said additive.

2. The process according to claim 1, wherein the quantity of said additive added to the waste material is regulated so that the ratio of $SiO_2$, $Al_2O_3$ or a mixture thereof over CaO is at least equal to 0.8.

3. The process according to claim 1, wherein said additive is selected from the group consisting of fossil silica, ground silica, ground pozzolana, waste products from the production of ferrosilicium, asbestos waste material, pulverulent alumina, a silico-aluminate, and fly ash from incineration.

4. The process according to claim 2, wherein said additive is selected from the group consisting of fossil silica, ground silica, ground pozzolana, waste products from the production of ferrosilicium, asbestos waste material, pulverulent alumina, a silico-aluminate and fly ash from incineration.

5. The process according to claim 1, wherein the water added comes from a source selected from the group consisting of surface or underground water, effluent, sludge from water purification and leaching products from waste outlets.

6. The process according to claim 2, wherein the water added comes from a source selected from the group consisting of surface or underground water, effluent, sludge from water purification and leaching products from waste outlets.

7. The process according to claim 3, wherein the water added comes from a source selected from the group consisting of surface or underground water, effluent, sludge from water purification and leaching products from waste outlets.

8. The process according to claim 4, wherein the water added comes from a source selected from the group consisting of surface or underground water, effluent, sludge from water purification and leaching products from waste outlets.

9. The process according to claim 5, wherein part of the water is supplied by spraying, and another part is added during the mixing or blending of the waste materials, the final mixture subsequently being compacted or extruded.

10. The process according to claim 6, wherein part of the water is supplied by spraying, and another part is added during the mixing or blending of the waste materials, the final mixture subsequently being compacted or extruded.

11. The process according to claim 7, wherein part of the water is supplied by spraying, and another part is added during the mixing or blending of the waste materials, the final mixture subsequently being compacted or extruded.

12. The process according to claim 8, wherein part of the water is supplied by spraying, and another part is added during the mixing or blending of the waste materials, the final mixture subsequently being compacted or extruded.

13. The process according to claim 1, further comprising adding components for concrete to the mixtures obtained to form a concrete mixture.

14. The process according to claim 2, further comprising adding components for concrete to the mixtures obtained to form a concrete mixture.

15. The process according to claim 3, further comprising adding components for concrete to the mixtures obtained to form a concrete mixture.

16. The process according to claim 4, further comprising adding components for concrete to the mixtures obtained to form a concrete mixture.

17. The process according to claim 5, further comprising adding components for concrete to the mixtures obtained to form a concrete mixture.

18. The process according to claim 6, further comprising adding components for concrete to the mixtures obtained to form a concrete mixture.

19. The process according to claim 7, further comprising adding components for concrete to the mixtures obtained to form a concrete mixture.

20. The process according to claim 8, further comprising adding components for concrete to the mixtures obtained for form a concrete mixture.

21. The process according to claim 9, further comprising adding components for concrete to the mixtures obtained to form a concrete mixture.

22. The process according to claim 10, further comprising adding components for concrete to the mixtures obtained to form a concrete mixture.

23. The process according to claim 11, further comprising adding components for concrete to the mixtures obtained to form a concrete mixture.

24. The process according to claim 12, further comprising adding components for concrete to the mixtures obtained to form a concrete mixture.

* * * * *